United States Patent
Ahn et al.

(10) Patent No.: US 8,311,106 B2
(45) Date of Patent: Nov. 13, 2012

(54) METHOD OF ENCODING AND DECODING MOTION PICTURE FRAMES

(75) Inventors: Tae-gyoung Ahn, Yongin-si (KR); Jae-hun Lee, Yongin-si (KR); Ki-won Yoo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1328 days.

(21) Appl. No.: 11/961,300

(22) Filed: Dec. 20, 2007

(65) Prior Publication Data

US 2008/0192830 A1 Aug. 14, 2008

(30) Foreign Application Priority Data

Feb. 14, 2007 (KR) .................. 10-2007-0015524

(51) Int. Cl.
*H04N 7/12* (2006.01)
*H04B 1/66* (2006.01)
(52) U.S. Cl. .................. 375/240.12; 375/240.29
(58) Field of Classification Search ............. 375/240.01, 375/240.12, 240.15
See application file for complete search history.

(56) References Cited

U.S. PATENT DOCUMENTS 6,442,206 B1 8/2002 Hrusecky
2005/0008240 A1* 1/2005 Banerji et al. ............... 382/238
2005/0265451 A1* 12/2005 Shi et al. .................. 375/240.15
2007/0121722 A1* 5/2007 Martinian et al. ....... 375/240.12
2010/0034254 A1* 2/2010 Wang ...................... 375/240.01

FOREIGN PATENT DOCUMENTS

| JP | 2006246277 A | 9/2006 |
| JP | 2006262159 A | 9/2006 |
| KR | 10-0376607 B1 | 3/2003 |
| KR | 10-2007-0038700 A | 4/2007 |

* cited by examiner

*Primary Examiner* — Jianye Wu
*Assistant Examiner* — Wanda Z Russell
(74) *Attorney, Agent, or Firm* — Sughrue Mion, PLLC (57) ABSTRACT

Provided is a method for encoding and decoding a motion picture frame, which achieve natural picture conversion of frames near an Instantaneous Decoding Refresh-I (IDR-I) frame. The decoding method includes: decoding a first frame which is a P frame that is to be displayed last among a plurality of P frames that are to be displayed before an IDR-I frame is displayed; decoding the IDR-I frame; decoding a second frame which is a P frame that is to be displayed first among a plurality of P frames that are to be displayed after the IDR-I frame is displayed; and maintaining a reference frame stored in a buffer, for decoding the first frame until the second frame is decoded. Therefore, by allowing frames near an IDR-I frame to access reference frames stored in a buffer, natural picture conversion is possible, and accordingly smooth picture conversion without flickering is possible.

19 Claims, 7 Drawing Sheets

METHOD OF ENCODING AND DECODING MOTION PICTURE FRAMES

CROSS-REFERENCE TO RELATED PATENT APPLICATION

This application claims priority from Korean Patent Application No. 10-2007-0015524, filed on Feb. 14, 2007, in the Korean Intellectual Property Office, the disclosure of which is incorporated herein in its entirety by reference.

BACKGROUND OF THE INVENTION

1. Field of the Invention

Methods consistent with the present invention relate to coding motion picture frames, and more particularly, to encoding and decoding motion picture frames while reducing flickering caused by unnatural picture conversion, when Instantaneous Decoding Refresh-I (IDR-I) frames are reproduced.

2. Description of the Related Art

The latest video coding standard, H.264, enhances encoding efficiency and performance using a variety of new techniques. Specifically, the H.264 standard defines an Instantaneous Decoding Refresh (IDR) frame in order to provide random access and prevent error propagation. The H.264 standard uses a plurality of reference frames that can be located far away from a current frame in a display order. The reference frames are restored in advance in a decoding order, stored in a memory space called a Decoded Picture Buffer (DPB), managed in the same way by an encoder and a decoder, and used for picture encoding and decoding. In order to allow the decoder to randomly access an encoded bit stream, encoding is performed using an IDR-I frame at a predetermined interval. When encoding is performed using an IDR-I frame, the encoder resets and empties all reference frames previously restored and stored in the DPB, and encodes pictures following the IDR-I frame with reference to only frames following the IDR-I frame. Accordingly, since the frames following the IDR-I frame have no correlation with the preceding frames, random access is allowed from the location of the IDR-I frame.

However, in the case of encoding using IDR-I frames to allow random access, the encoding efficiency of pictures adjacent to each IDR-I frame deteriorates compared to encoding using I frames, and picture flickering occurs due to low consistency of pictures. Although an I frame and an IDR-I frame maintain the same picture quality, differences in picture quality will exist between pictures following the I frame and pictures following the IDR-I frame. When encoding is performed using I frames, P and B frames following each I frame can refer to P frames before the I frame appears. However, when encoding is performed using IDR-I frames, P and B frames following each IDR-I frame cannot refer to any frame before the IDR-I frame appears. Accordingly, picture consistency deteriorates from the location of the IDR-I frame, so that unnatural picture conversion, for example, screen flickering, etc., appears.

SUMMARY OF THE INVENTION

The present invention provides a motion frame encoding and decoding method that achieves natural picture conversion between frames near an Instantaneous Decoding Refresh-I (IDR-I) frame.

The present invention also provides a computer-readable recording medium having embodied thereon a program for executing the motion frame encoding and decoding method.

In order to achieve the above objects, the motion frame encoding and decoding method according to the present invention allows frames near an IDR-I frame to access a buffer in which reference frames are stored, and therefore natural picture conversion is possible.

According to an aspect of the present invention, there is provided a method of decoding a motion picture frame comprising: decoding a first frame which is a P frame that is to be displayed last among a plurality of P frames that are to be displayed before an Instantaneous Decoding Refresh-I (IDR-I) frame is displayed; decoding the IDR-I frame; decoding a second frame which is a P frame that is to be displayed first among a plurality of P frames that are to be displayed after the IDR-I frame is displayed; and maintaining a reference frame stored in a buffer for decoding the first frame until the second frame is decoded.

The method may further comprise decoding a plurality of B frames that are to be displayed between the first frame and the IDR-I frame in a display order, with reference to the reference frame. The maintaining of the reference frame may comprise emptying the buffer after decoding a B frame that is to be displayed last among the plurality of B frames. The method may further comprise: decoding a B frame or a P frame that is to be displayed after the first frame is displayed to generate a first restored frame; generating a second restored frame using the first restored frame and the reference frame; and displaying the second restored frame.

The buffer may be a Decoded Picture Buffer (DPB).

According to another aspect of the present invention, there is provided a method of decoding a motion picture frame comprising: decoding a current frame to generate a first restored frame; storing the first restored frame in a buffer; if the current frame is an Instantaneous Decoding Refresh-I (IDR-I) frame, copying a first buffer index of the buffer to generate a second buffer index, resetting the first buffer index, and displaying the first restored frame; if the current frame is near the IDR-I frame in a display order, accessing a first reference frame stored in the buffer using the second buffer index, generating a second restored frame using the first reference frame and the first restored frame, and displaying the second restored frame; and if the current frame is not near the IDR-T frame, displaying the first restored frame.

The generating of the second restored frame may comprise: performing motion estimation on the first reference frame and the first restored frame to generate a third restored frame; and calculating a weighted average value of the first restored frame and the third restored frame to generate the second restored frame. The generating of the second restored frame may also comprise: calculating a frame distance ratio, which is a ratio between the number of frames between the first restored frame and the first reference frame, and the number of frames between the first restored frame and a second reference frame which the first restored frame refers to when the first restored frame is decoded; scaling a first motion vector which is used when the first restored frame is decoded, according to the frame distance ratio to generate a second motion vector; applying the second motion vector to the current frame to generate a third restored frame; and calculating a weighted average value of the first restored frame and the third restored frame to generate the second restored frame. The generating of the second restored frame may also comprise: obtaining an absolute difference between each macroblock of the first restored frame and a corresponding macroblock of the first reference frame; obtaining a sum of absolute differences (SAD) for all macroblocks of the first restored frame; if the SAD is less than a predetermined first reference value, applying motion compensation to the predetermined first reference frame and the first restored frame to generate a third restored frame, and calculating a weighted average value of the first restored frame and the third restored frame to generate the second restored frame; if the SAD is greater than the predetermined first reference value and less than a predetermined second reference value, selecting the first reference frame as the second restored frame; and if the SAD is greater than the second reference value, selecting the first restored frame as the second restored frame.

The method may further comprise, if a difference between the current frame and the IDR-I frame in a display order is within a predetermined distance range, determining that the current frame is near the IDR-I frame. The method may further comprise, if a difference between the current frame and the IDR-I frame in a display time is within a predetermined time interval, determining that the current frame is near the IDR-I frame. The method further comprises, if the current frame refers to a different frame across the IDR-I frame, determining that the current frame is near the IDR-I frame.

The buffer may be a Decoded Picture Buffer (DPB).

According to another aspect of the present invention, there is provided a method of encoding a motion picture frame comprising: encoding a first frame, which is a P frame that is to be displayed last among a plurality of P frames that are to be displayed before an Instantaneous Decoding Refresh-I (IDR-I) frame is displayed; encoding the IDR-I frame; encoding a second frame which is a P frame that is to be displayed first among a plurality of P frames that are to be displayed after the IDR-I frame is displayed; and maintaining a reference frame stored in a buffer for encoding the first frame until the second frame is encoded.

The method may further comprise encoding a plurality of B frames that are to be displayed between the first frame and the IDR-I frame in a display order, with reference to the reference frame. The maintaining of the reference frame may comprise emptying the buffer after encoding a B frame that is to be displayed last among the plurality of B frames.

The buffer is a Decoded Picture Buffer (DPB).

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF THE INVENTION

Hereinafter, a motion frame encoding and decoding method according to the present invention will be described in detail with reference to the appended drawings.

Figure 1:
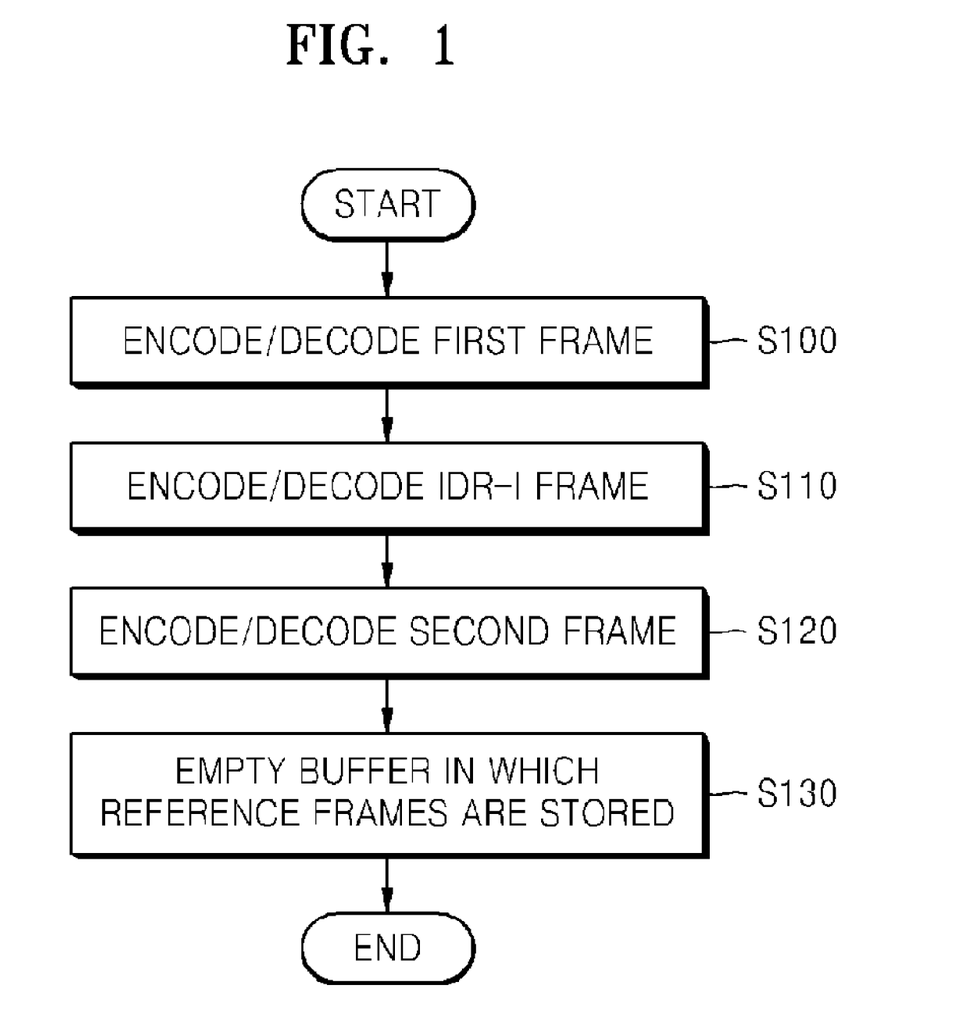
FIG. 1 is a flowchart of a motion picture encoding and decoding method according to a first exemplary embodiment of the present invention.

FIG. 1 is a flowchart of a motion picture encoding and decoding method according to a first exemplary embodiment of the present invention.

In the motion picture encoding and decoding method, by allowing frames near an Instantaneous Decoding Refresh-I (IDR-I) frame to access a buffer in which reference frames are stored, natural picture conversion is possible.

The motion picture encoding and decoding method allows the frames near the IDR-T frame to access a buffer by delaying a time at which the buffer is emptied.

The time at which the buffer is emptied is defined in the H.264 standard. In this exemplary embodiment, both an encoder and a decoder must be based on the H.264 standard. In order to delay the time at which the buffer is emptied, both the encoder and the decoder must recognize the time delay. Accordingly, in this exemplary embodiment, the H.264 standard may need to be changed.

In the exemplary embodiment illustrated in FIG. 1, an encoding method and a decoding method are performed in the same way. Accordingly, only the encoding method is described, and a detailed description for the decoding method will be omitted.

First, a first frame is encoded (operation S100). In this exemplary embodiment, the first frame is a final P frame among P frames which must be displayed before an IDR-I frame is displayed. The first frame corresponds to a 30th frame in a display order as illustrated in FIG. 2B.

Then, an IDR-I frame is encoded (operation S110). The IDR-I frame corresponds to a 33rd frame in a display order as illustrated in FIG. 2B.

In the H.264 standard, since a buffer is emptied before an IDR-I frame is encoded, it is impossible to access reference frames previously stored in the buffer when the IDR-I frame is encoded.

However, in the encoding method according to this exemplary embodiment, since the buffer is not emptied before the IDR-I frame is encoded, it is possible to access reference frames previously stored in the buffer when the IDR-I frame is encoded.

Then, a second frame is encoded (operation S120). In this exemplary embodiment, the second frame is a first P frame among P frames which must be displayed after the IDR-I frame is displayed. The second frame corresponds to a 36th frame in the display order as illustrated in FIG. 2B.

In the encoding method, the buffer is not emptied until the second frame is encoded.

The encoding method includes emptying the buffer in which reference frames are stored after the second frame is encoded (operation S130). However, it is possible to delay a time at which the buffer is emptied until later frame is encoded.

Figure 2A:
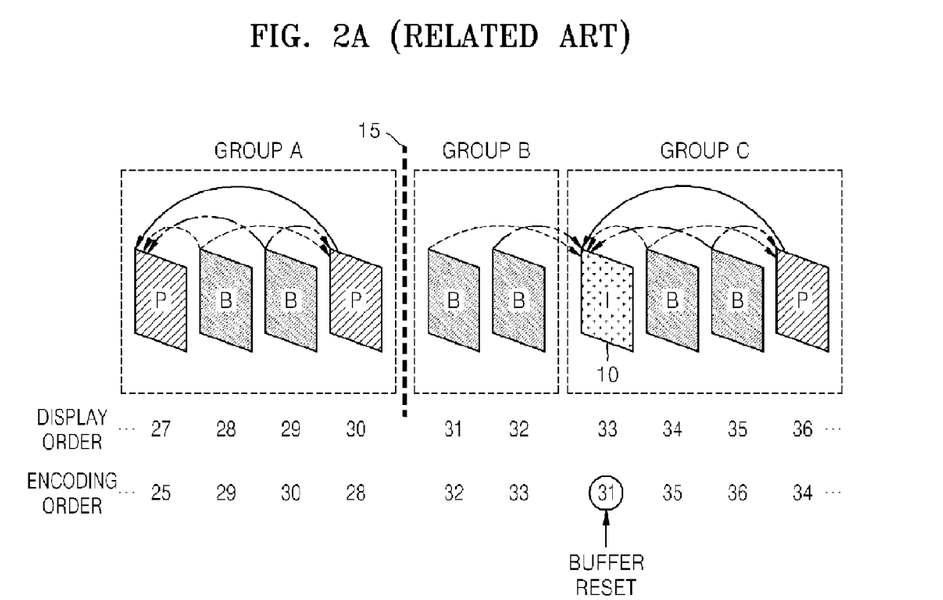
FIG. 2A is a view for explaining a conventional frame referencing method.
Figure 2B:
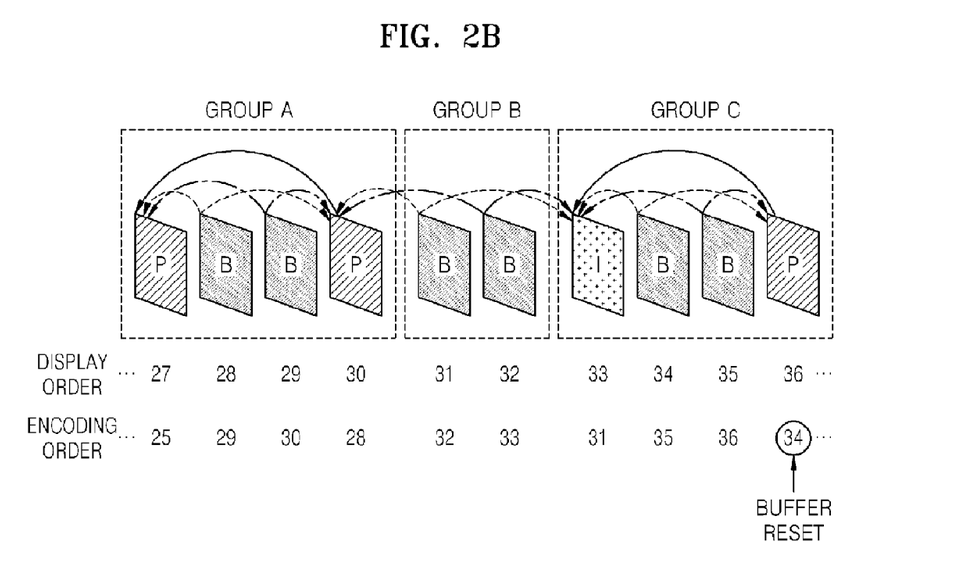
FIG. 2B is a view for explaining a frame referencing method to which the motion picture encoding and decoding method illustrated in FIG. 1 is applied.

FIGS. 2A and 2B illustrate the difference between the case in which the encoding (or decoding) method according to this exemplary embodiment is applied and the case where the encoding (or decoding) method according to this exemplary embodiment is not applied will be described below.

FIG. 2A is a view for explaining a conventional frame referencing method when this exemplary embodiment is not applied.

FIG. 2A illustrates a frame display order and a frame encoding order. The frame decoding order is the same as the frame encoding order.

First, frames in group A are encoded. The 30th frame in a display order (the 28th frame in the encoding order) is encoded with reference to the 27th frame in the display order. Next, the 28th frame and the 29th frame in the display order (the 29th frame and a 30th frame in the encoding order, respectively) are encoded with reference to the 27th frame and the 30th frame in the display order. Reference frames that are to be referred to are stored in a buffer.

Then, an IDR-I frame 10 (the 31st frame in the encoding order) is encoded. In the conventional frame referencing method, the buffer is reset before the IDR-I frame 10 is encoded.

After the IDR-I frame 10 is encoded, frames in group B (the 32nd and 33rd frames in the encoding order) are encoded. The frames in the group B will be displayed prior to the IDR-I frame 10. Group B includes B frames referring to only the IDR-I frame 10.

After the frames in group B are encoded, the frames in group C (the 34th, 35th, and 36th frames in the encoding order) are encoded. The frames in group C will be displayed after the IDR-I frame 10.

In the conventional frame referencing method, since the IDR-I frame 10 and frames near the IDR-I frame 10 (the 31st frame and frames later in the encoding order, i.e. the frames to the right of the dashed line 15) are encoded independently from the preceding frames, a difference between pictures is generated. In particular, due to significant differences between pictures of the frames in group B and pictures of the frames in group A, flickering and a sense of interruption appear when the decoded pictures are displayed. Since the frames in group B are encoded with reference to only the IDR-I frame 10, the frames have no correlation with the frames belonging to group A.

In order to resolve such a problem, when the frames in group B are encoded, the frames are preferably encoded with reference to reference frames stored in the buffer. In the encoding method according to this exemplary embodiment, the buffer is reset just before a P frame (the 34th frame in the encoding order) following the IDR-I frame 10 is encoded, instead of just before the IDR-I 10 frame (the 31st frame in the encoding order) is encoded.

FIG. 2B is a view for explaining a frame referencing method to which the motion picture encoding and decoding method illustrated in FIG. 1 is applied.

Referring to FIG. 2B, the buffer is reset just before the 34th frame in the encoding order is encoded, that is, just after a final B frame (the 33rd frame in the encoding order) in group B is encoded.

According to the first exemplary embodiment of the present invention, frames are encoded as follows.

First, the frames in group A (the 28th, 29th, and 30th frames in an encoding order) are encoded. Then, an IDR-I frame (the 31st frame in the encoding order) is encoded. However, at this time, the buffer is not reset.

Then, the frames in group B are encoded. At this time, the frames (the 32nd and 33rd frames in the encoding order) are encoded with reference to the IDR-I frame and the preceding frames stored in the buffer. In the frame referencing method illustrated in FIG. 2B, the 32nd and 33rd frames in the encoding order are encoded with reference to a final P frame (the 28th frame in the encoding order) of group A and the IDR-I frame.

After the frames in group B are encoded, the buffer is reset.

After the buffer is reset, frames (the 34th frame and the frames following in the encoding order) in group C are encoded.

As described above, the frame referencing method according to this exemplary embodiment is applied in the same way to an encoder and a decoder. Accordingly, a detailed description for a decoding method will be omitted.

A second exemplary embodiment of the present invention is a modification of the first exemplary embodiment of the present invention.

In the first exemplary embodiment, frames near an IDR-I frame can access a buffer in which reference frames are stored by delaying a time at which the buffer is emptied. In the first exemplary embodiment illustrated in FIG. 2B, the frames near the IDR-I frame correspond to frames in group B.

However, in the second exemplary embodiment, although a time at which a buffer is emptied is based on the H.264 standard, frames near an IDR-I frame can access the buffer in which reference frames are stored.

According to the H.264 standard, if a decoder receives an IDR-I frame, the decoder controls the process so that any frame in a buffer cannot be referred to by marking the frames in the buffer as non-reference frames. Also, the decoder resets the buffer index. Accordingly, the buffer appears to be empty.

However, reference frames still exist in the buffer, even though they are marked as non-reference frames. Rather, the reference frames exist in the buffer until different frames are stored at the locations where the reference frames are stored.

Accordingly, if a means to directly access the buffer is provided, it is possible to access the reference frames stored in the buffer and thus generate a restored frame using the reference frames. Such means will be described in detail a the third exemplary embodiment.

In this exemplary embodiment, since an original buffer index is reset, an encoder or a decoder based on the conventional H.264 standard cannot access the reference frames stored in the buffer. Accordingly, the second exemplary embodiment can be applied to only a decoding method, and cannot be applied to an encoding method.

Figure 3:
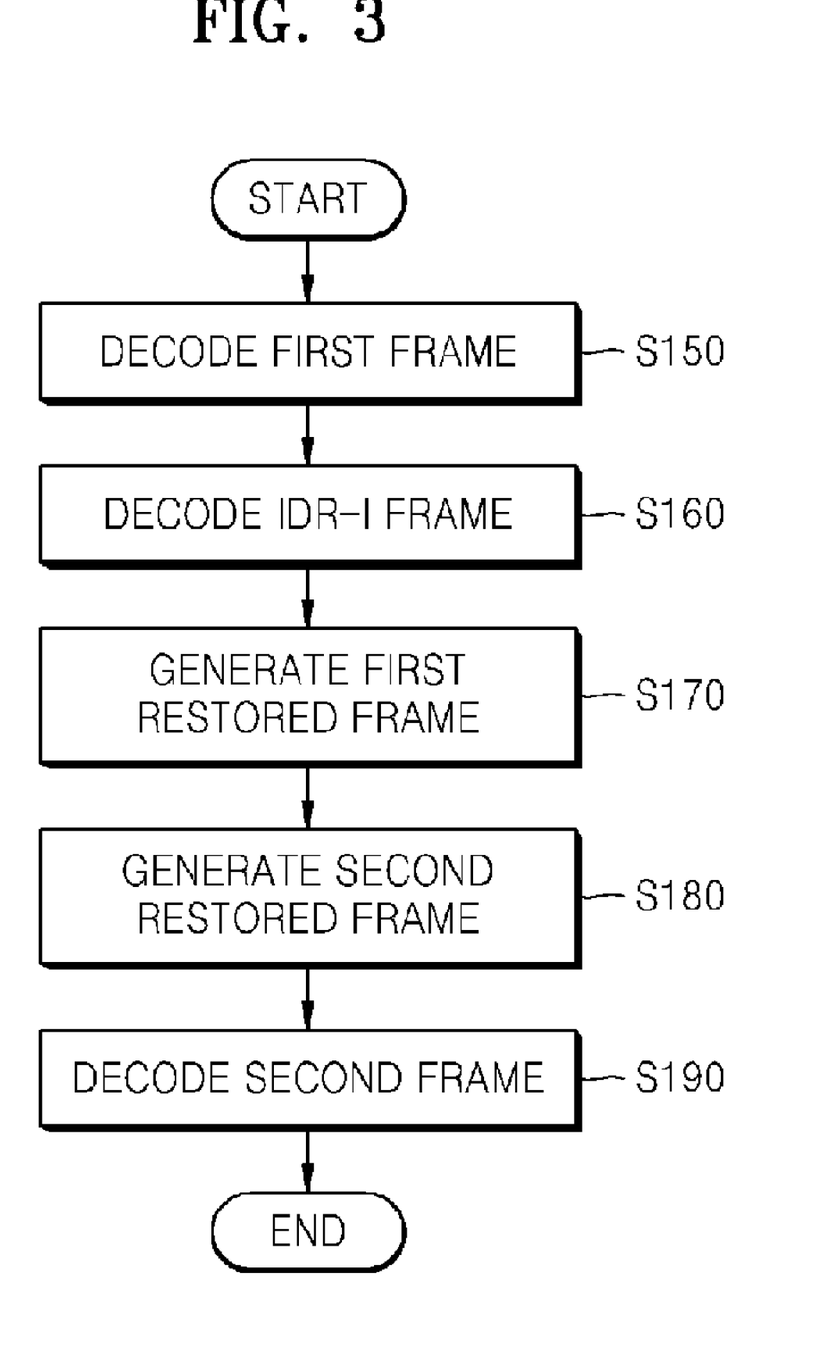
FIG. 3 is a flowchart of a motion picture decoding method according to a second exemplary embodiment of the present invention.

FIG. 3 is a flowchart of a motion picture decoding method according to a second exemplary embodiment of the present invention.

First, a first frame is decoded (operation S150). The first frame is a P frame that is to be displayed last among P frames that are to be displayed before an IDR-I frame is displayed. The first frame corresponds to the 30th frame in the display order illustrated in FIG. 2A.

Then, an IDR-I frame is decoded (operation S160). Before the IDR-I frame is decoded, a buffer is reset according to the H.264 standard.

The following operations S170 and S180 are performed on each B or P frame near the IDR-I frame. Hereinafter, each B or P frame is referred to as a decoding target frame.

First, each decoding target frame is decoded according to the H.264 standard, so that a first restored frame is generated (operation S170).

In the second exemplary embodiment, a frame referencing method is generally based on the H.264 standard. Accordingly, the frame referencing method as illustrated in FIG. 2A is applied first. According to the frame referencing method as illustrated in FIG. 2A, for the frames in group B and group C, a first restored frame is decoded with reference to only the IDR-I frame 10 and its following frames, without referring to reference frames stored in the buffer.

In the H.264 standard, the first restored frame is displayed. However, in the decoding method according to the second exemplary embodiment, a second restored frame is generated (operation S180) and displayed.

In the second exemplary embodiment, it is assumed that a buffer accessing means to access the buffer even after the buffer is reset according to the H.264 standard is provided. In order to generate the second restored frame, the decoder accesses reference frames stored in the buffer using the buffer accessing means. The second restored frame is generated using the reference frames and the first restored frame.

After a first restored frame and a second restored frame for the respective frames in group B are generated, a second frame is decoded (operation S190). The second frame is a P frame that is to be displayed first, among frames that are to be displayed after the IDR-I frame 10 is displayed. The second frame corresponds to a 36th frame in the display order illustrated in FIG. 2A.

While not illustrated in FIG. 3, after the second frame is decoded, the process may further include generating a first restored frame and a second restored frame for each of frames in group C and the frames following.

The second restored frame is generated, using both the first restored frame and the reference frames stored in the buffer. Accordingly, by displaying the second restored frame for each of frames near the IDR-I frame, natural picture conversion without picture flickering near an IDR-I frame is possible. A method of generating a second restored fame will be described in more detail in the following third exemplary embodiment.

The second exemplary embodiment has common ground with the first exemplary embodiment in that the reference frames stored in the buffer, which are used to decode the first frame, are maintained at least until the second frame is decoded.

The third exemplary embodiment of the present invention provides a method of receiving a bit stream encoded according to the H.264 standard, and reducing unnatural picture conversion near an IDR-I frame by adopting post processing while following the H.264 standard in a decoder. Hereinafter, the third exemplary embodiment of the present invention will be described in detail with reference to FIGS. 4 through 8.

In the third exemplary embodiment, details of the second exemplary embodiment are described. Accordingly, in the third exemplary embodiment, reference frames stored in a buffer which are used to decode a first frame are maintained at least until a second frame is decoded.

Figure 4:
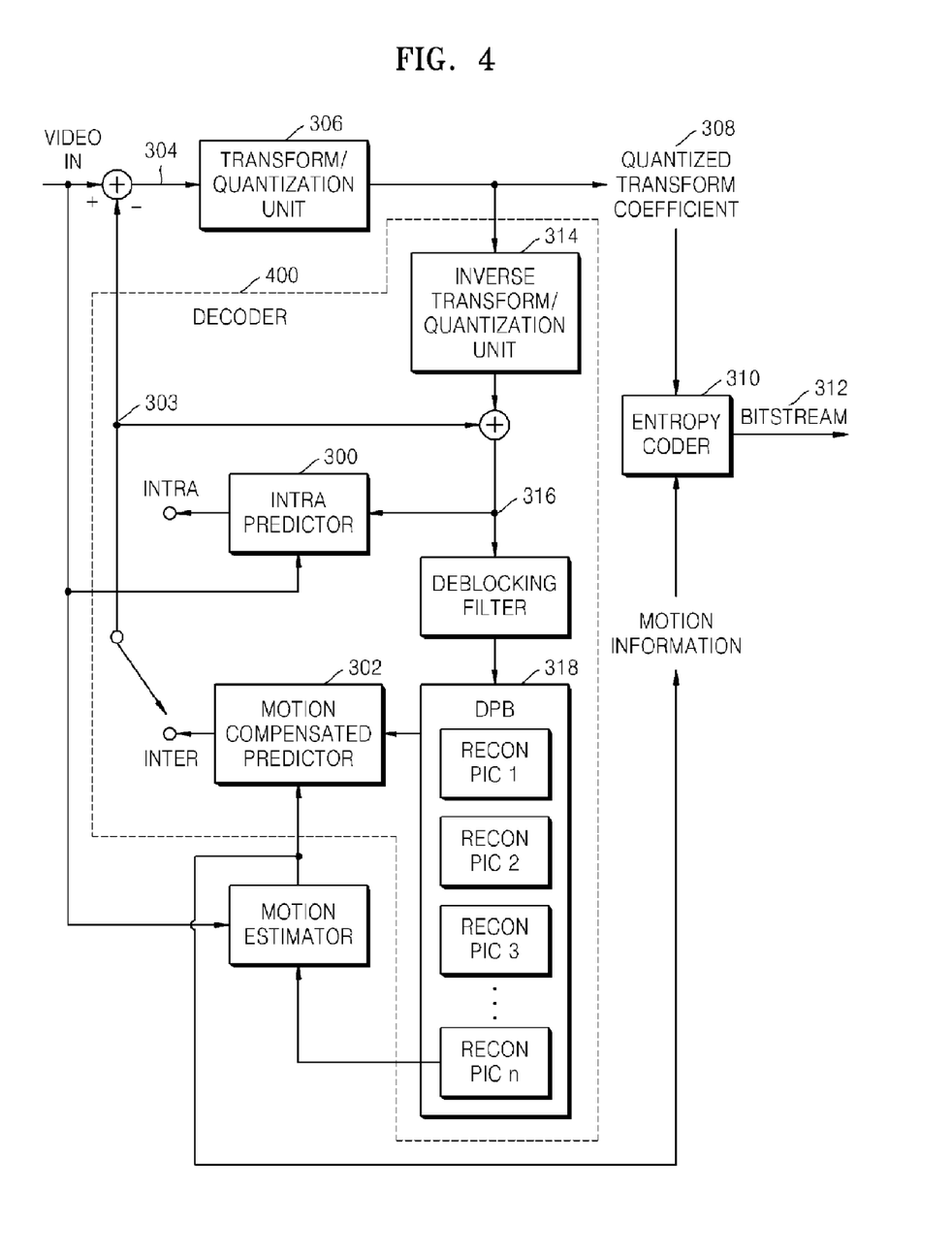
FIG. 4 is a block diagram showing an exemplary H.264 encoder and an exemplary H.264 decoder.

The third exemplary embodiment, like the second exemplary embodiment, includes generating a first restored frame according to the H.264 standard for each decoding target frame. Accordingly, in order to explain the third exemplary embodiment, an H.264-based encoder and an H.264-based decoder are described. FIG. 4 is a block diagram showing an exemplary H.264 encoder and an exemplary H.264 decoder.

In a motion picture compression using the H.264 standard, a picture can be encoded to one of I, P, and B frames. An I frame is obtained by encoding a current picture using only its internal spatial correlation. The I frame can be restored (decoded) using only frame data without referring to any different frame in a decoder. A P frame is obtained by encoding a current picture using inter prediction with reference to a temporally previously restored frame, wherein the P frame can refer to a plurality of pictures according to the H.264 standard, and pictures that are to be referred to by the P frame are pictures previously decoded in a decoding order (not necessarily in a display order). The P frame can be restored using a previously restored picture in a decoder. A B frame is obtained by encoding a current picture through inter prediction using a forwardly restored picture (list0 in the H.264 standard) and a backwardly restored picture (list1 in the H.264 standard). The B frame can be restored using the forwardly and backwardly restored pictures in a decoder.

Referring to FIG. 4, a H.264-based encoder performs intra prediction or inter prediction through an intra predictor 300 or a motion compensated predictor 302, obtains a residue 304, which is a difference between a current frame and a predicted picture 303, performs transform/quantization on the residue 304 and intra or inter mode information through a transform/quantization unit 306, and performs entropy-encoding on a quantized transform coefficient 308 obtained after the transform/quantization through an entropy coder 310, thereby generating a bit stream 312. The bit stream produced from the transform/quantization unit 306 is subjected to inverse-transform/quantization through an inverse-transform/quantization unit 314, and then is added to the predicted picture 303, so that a restored picture 316 is generated. The restored picture 316 is stored in a memory buffer, for example, in a Decoded Picture Buffer (DPB) 318, in order to be used as a reference frame for pictures that are to be encoded to P or B frames.

A motion picture decoder, which receives the entropy-encoded bit stream 312, operates in substantially the same way as the decoder 400 shown in FIG. 4. The motion picture decoder entropy decodes the entropy-encoded bit stream 312, and applies the entropy-decoded bit stream 312 to an inverse transform/quantization unit such as the inverse transform/quantization unit 314 of FIG. 4. The decoder receives a bit stream, generates a restored picture in the same way as a decoding loop of an encoder, outputs the restored picture to a display terminal so that a user can view the corresponding motion picture, and stores the restored picture in a DPB so that the restored picture can be used as a reference frame of a picture that is to be decoded next.

In order to allow the motion picture decoder to randomly access a picture, the encoder inserts an IDR-I frame into a generated bit stream at a predetermined interval. The IDR-I frame is written to the bit stream as "nal_unit_type" 5 in a Network Adaptation Layer (NAL) unit. After encoding the IDR-I frame, the encoder resets the DPB buffer and performs encoding using pictures restored after the IDR-I frame is encoded, without referring to pictures restored before the IDR-I frame is encoded, when encoding P or B frames after the IDR-I frame. If the encoder resets the DPB buffer in this way, the decoder checks only the "nal_unit_type" of the NAL unit of the bit stream, and performs decoding from the IDR-I frame of the bit stream if the "nal_unit_type" indicates an IDR-I frame, thereby restoring pictures. Since the decoder starts decoding in the state that no restored picture is stored in the DPB of the decoder when the decoder performs decoding of an IDR-I frame at a random position, the DPB is reset when the IDR-I frame is generated by considering the state of the decoder from when encoding is performed.

In the case of performing encoding after inserting an IDR-I frame, random access of the decoder is possible. However, in the case of sequential access as described above, picture quality deterioration occurs due to the insertion of the IDR-I frame. Although an I frame and an IDR-I frame maintain the same picture quality, differences in picture quality will be generated between pictures following the I frame and pictures following the IDR-I frame.

Figure 5:
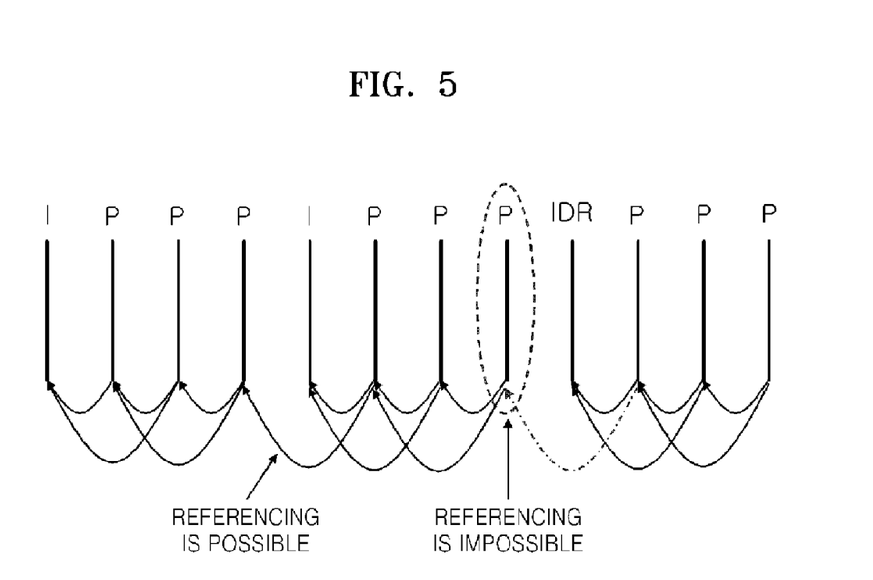
FIG. 5 is a view for explaining a frame referencing method used in an IPPP structure.
Figure 6:
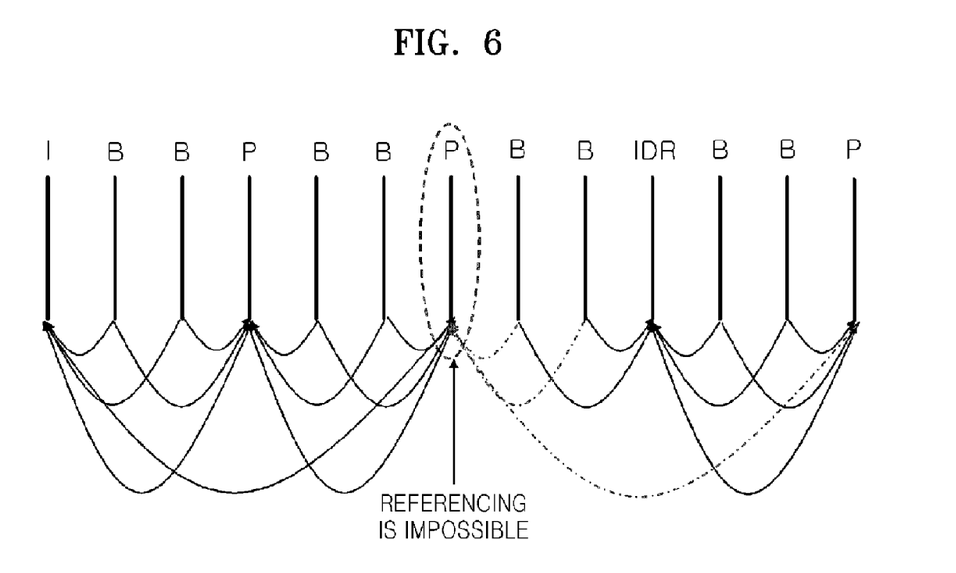
FIG. 6 is a view for explaining a frame referencing method used in an IBBP structure.
Figure 7:
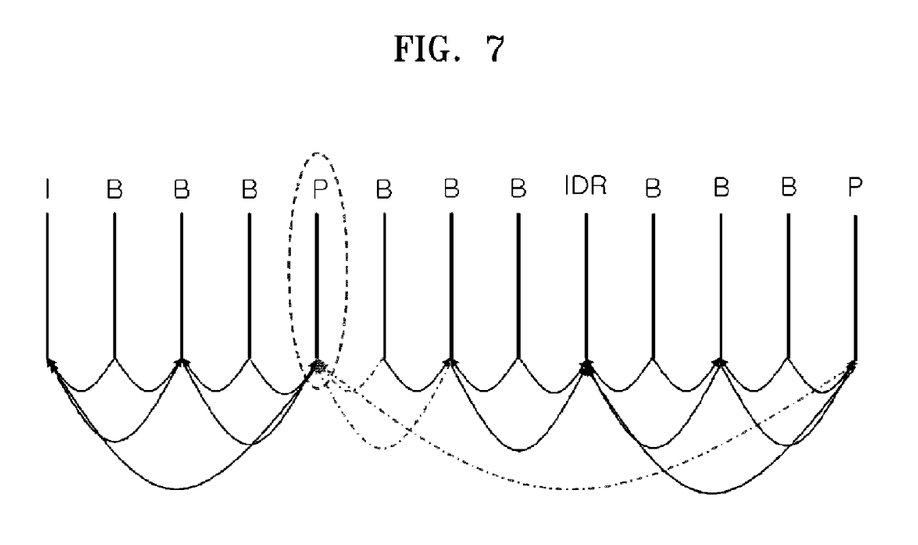
FIG. 7 is a view for explaining a frame referencing method used in an IBBBP structure.

FIG. 5 is a view for explaining a frame referencing method used in an IPPP structure, FIG. 6 is a view for explaining a frame referencing method used in an IBBP structure, and FIG. 7 is a view for explaining a frame referencing method used in an IBBBP structure.

In the case of an I frame, P frames following the I frame can be predicted with reference to restored pictures before the I frame appears. However, in the case of an IDR-I frame, P frames following the IDR-I frame cannot refer to restored pictures before the IDR-I frame appears, and accordingly the picture quality of the P frames may deteriorate. This is because P frames, as illustrated surrounded by dotted lines in FIGS. 5 through 7, are not referred to. Also, since prediction between pictures before the IDR-I frame appears and pictures after the IDR-I frame appear is interrupted, unnatural connection appears at boundary parts between restored pictures before the IDR-I frame appears and restored pictures after the IDR-I frame appears.

Increasingly, users require high picture quality, and the picture quality of restored pictures generated through motion picture encoding and decoding is gradually enhanced due to the development of storage media or transmission paths. As the picture quality of each restored picture is gradually enhanced, unnatural connections between pictures become more significant. Since motion pictures are displayed in real time at an actually recorded frame rate, which is different from still pictures, such unnatural connections between pictures have great influence on subjective picture quality.

Figure 8:
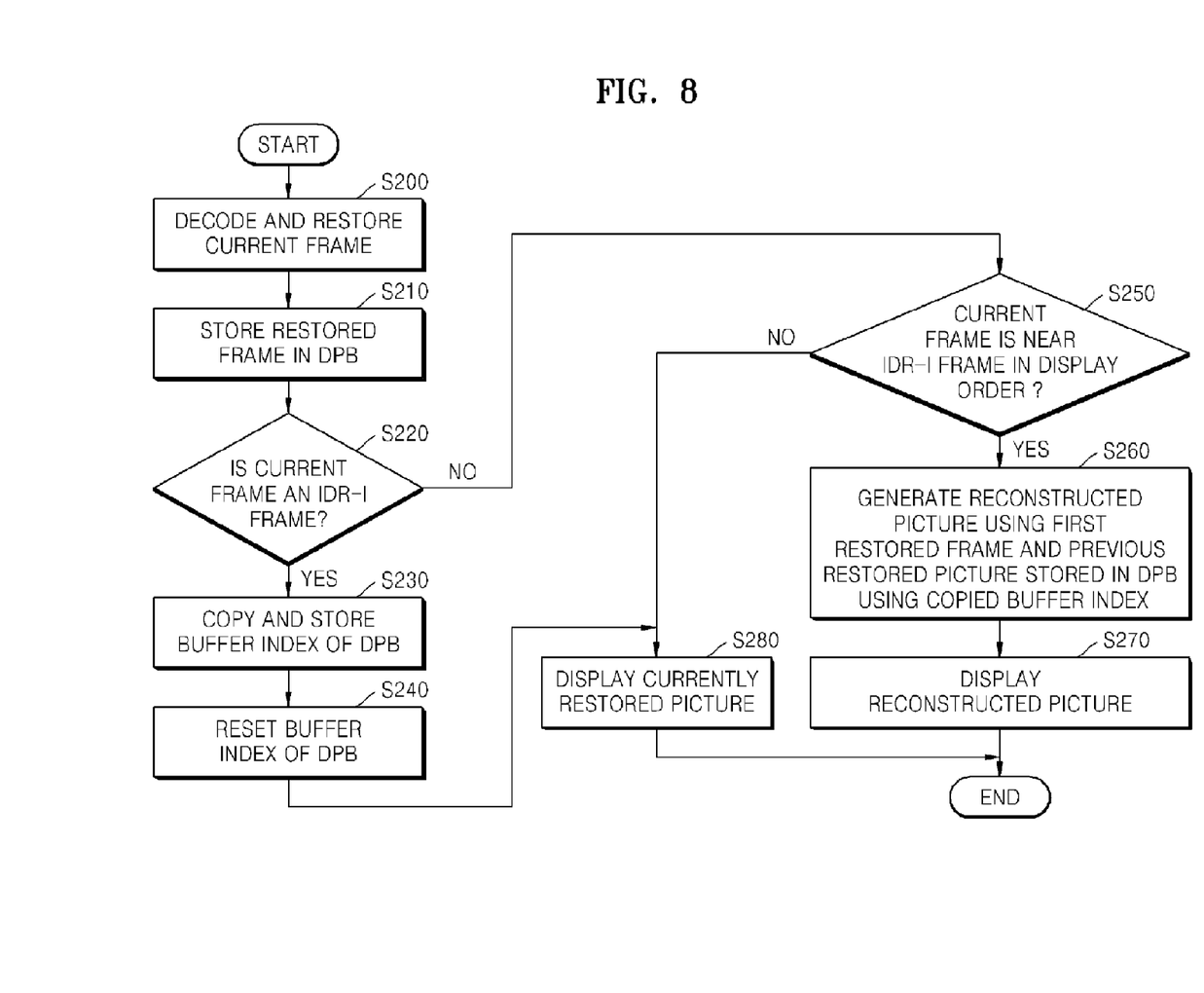
FIG. 8 is a flowchart of a decoding method according to a third exemplary embodiment of the present invention.

FIG. 8 is a flowchart of a decoding method according to a third exemplary embodiment of the present invention.

As described above, the decoding method according to the third exemplary embodiment cannot be applied to an encoder.

First, decoding is performed on a current frame according to the H.264 standard, so that a frame is restored (operation S200). In the current exemplary embodiment, the restored frame is referred to as a first restored frame.

The first restored frame is stored in a DPB (operation S210).

Then, it is determined whether the current frame is an IDR-I frame (operation S220).

If the current frame is an IDR-I frame, an index (hereinafter, referred to a first buffer index) of the DPB is copied and stored (operation S230). The copied index is hereinafter referred to as a second buffer index. Then, the first buffer index is reset (operation S240). At this time, restored pictures actually stored in the DPB are not removed. Successively, the currently restored picture is displayed (operation S280).

If the current frame is not an IDR-I frame, it is determined whether the current frame is near an IDR-I frame in a display order (operation S250). A determination of whether the current frame is near an IDR-I frame in a display order is done according to the following criterion.

For example, if a distance difference between the current frame and the IDR-I frame is within a predetermined range in the display order, it is determined that the current frame is near the IDR-I frame. The predetermined range can be set to a range of, for example, 5 frames before or after the IDR-I frame appears. However, the present invention is not limited to this, and the predetermined range can be set to different ranges according to the performance of a decoder.

In another example, if a time difference between the current frame and the IDR-I frame is within a predetermined time interval in the display time, it can be determined that the current frame is near the IDR-I frame. The predetermined time interval may be set to 0.1 second, for example. However, the present invention is not limited to this, and the predetermined time interval can be set to different times according to the performance of the decoder.

In still another example, if the current frame refers to different frames across the IDR-I frame, it can be determined that the current frame is near the IDR-I frame.

If the current frame is a frame near the IDR-I frame, a new reconstructed picture (hereinafter, referred to as a second restored frame) is generated from the first restored frame and the previous restored picture (hereinafter, referred to as a first reference frame) stored in the DPB, using the second buffer index copied and stored in operation S230 (operation S260). Various methods can be used to generate the second restored frame.

If processing power of the decoder is sufficient, motion estimation is performed in the same way as that of the encoder, using the first restored frame and the first reference frame, and then motion compensation like bidirectional motion compensation of a B frame is performed so that a motion-compensated picture (hereinafter, referred to as a third restored frame) is generated. The second restored frame is generated in the form of a weighted average of the third restored frame and the first restored frame (the first method).

In another example, instead of performing motion prediction like the first method, a motion vector (hereinafter, referred to as a first motion vector) of a currently restored picture is subjected to scaling based on a distance ratio, like a temporal direct mode of when a B frame is decoded, a motion vector (hereinafter, referred to as a second motion vector) for a first reference frame is induced, and then motion compensation like bidirectional motion compensation of a B frame is performed so that a motion-compensated picture (a third restored frame) is generated. Then, the second restored frame can be generated in the form of a weighted average of the third restored frame and the first restored frame.

That is, by calculating a frame distance ratio a:b between the number (a) of frames between the first restored frame and the first reference frame, and the number (b) of frames between the first restored frame and a frame (a second reference frame) to which the first restored frame refers when being decoded, scaling a first motion vector according to the frame distance ratio a:b to generate a second motion vector, and then applying the second motion vector to a current frame, a third restored frame is generated (second method).

It is possible that the motion vector is obtained according to the first or second method, and the third restored frame is generated using a different method after the motion vector is obtained. For example, an absolute difference (an absolute value of a difference) at a motion vector location is calculated in units of macroblocks of the first restored frame, a sum of absolute differences (SAD) of all macroblocks of the first restored frame is calculated, wherein the SAD corresponds to a cost, and then a reconstructed picture (the second restored frame) is generated using different methods according to the size of the cost (third method). Here, it is possible that reference values (for example, T1 and T2, T1<T2) are set and the SAD is compared to the reference values.

If the SAD is less than T1, motion compensation like bidirectional motion compensation of a B frame is performed, thus a motion-compensated picture (the third restored frame) is generated, and a reconstructed picture (the second restored frame) is generated in the form of a weighted average value of the currently restored picture (the first restored frame) and the motion-compensated picture (the third restored picture).

If the SAD is greater than T1 and less than T2, the first reference frame stored in a buffer can be selected as a reconstructed picture (the second restored frame).

If the SAD is greater than T2, the first restored frame can be selected as a reconstructed picture (the second restored picture).

A variety of methods can be used to generate the reconstructed picture (the second restored frame).

As such, after the decoder accesses the first reference frame using the second buffer index and generates the reconstructed picture (the second restored frame) using the first reference frame and the first restored frame (operation S260), the reconstructed picture is displayed (operation S270).

If it is determined in operation S250 that the current frame is not near the IDR-I frame, the first restored frame which is the currently restored picture is displayed (operation S280).

The exemplary embodiments described above achieve natural picture conversion by maintaining a reference frame stored in a buffer, which is used to decode a first frame, at least until a second frame is decoded so that frames near an IDR-I frame can access the buffer in which reference frames are stored.

An encoder can use only the first exemplary embodiment, however a decoder can use each exemplary embodiment.

The decoding method according to the present invention is applied when sequential access for displaying all of groups A, B, and C as illustrated in FIG. 2A is performed. At random access to an IDR-I frame, flickering due to picture conversion does not occur, since direct access to the IDR-I frame is performed. In this case, since group B (the 32nd and 33rd frames in a decoding order) is not displayed, the 32nd and 33rd frames do not need to be decoded. Accordingly, the decoding order skips from the 31st frame (an IDR-I frame 10) to a 34th frame (a P frame).

The present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and the like.

In the motion picture encoding and decoding method according to the present invention, by allowing frames near an IDR-I frame to access a buffer in which reference frames are stored, natural picture conversion is possible, and accordingly smooth picture conversion without flickering is possible.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of decoding a motion picture frame, the method comprising:
   decoding a first frame which is a P frame that is to be displayed last among a plurality of P frames that are to be displayed before an Instantaneous Decoding Refresh-I (IDR-I) frame is displayed;
   decoding the IDR-I frame;
   decoding a second frame which is a P frame that is to be displayed first among a plurality of P frames that are to be displayed after the IDR-I frame is displayed; and
   maintaining a reference frame stored in a buffer for decoding the first frame until the second frame is decoded.

2. The method of claim 1, further comprising decoding a plurality of B frames that are to be displayed between the first frame and the IDR-I frame in a display order, with reference to the reference frame.

3. The method of claim 2, wherein the maintaining of the reference frame comprises emptying the buffer after decoding a B frame that is to be displayed last among the plurality of B frames.

4. The method of claim 1, further comprising:
   decoding a B frame or a P frame that is to be displayed after the first frame is displayed to generate a first restored frame;
   generating a second restored frame using the first restored frame and the reference frame; and
   displaying the second restored frame.

5. The method of claim 1, wherein the buffer is a Decoded Picture Buffer (DPB).

6. A method of decoding a motion picture frame, the method comprising:
   decoding a current frame to generate a first restored frame;
   storing the first restored frame in a buffer;
   if the current frame is an Instantaneous Decoding Refresh-I (IDR-I) frame, copying a first buffer index of the buffer to generate a second buffer index, resetting the first buffer index, and displaying the first restored frame;
   if the current frame is near the IDR-I frame in a display order, accessing a first reference frame stored in the buffer using the second buffer index, generating a second restored frame using the first reference frame and the first restored frame, and displaying the second restored frame; and
   if the current frame is not near the IDR-I frame, displaying the first restored frame.

7. The method of claim 6, wherein the generating of the second restored frame comprises:
   performing motion estimation on the first reference frame and the first restored frame to generate a third restored frame; and
   calculating a weighted average value of the first restored frame and the third restored frame to generate the second restored frame.

8. The method of claim 6, wherein the generating of the second restored frame comprises:
   calculating a frame distance ratio, which is a ratio between the number of frames between the first restored frame and the first reference frame, and the number of frames between the first restored frame and a second reference frame which the first restored frame refers to when the first restored frame is decoded;
   scaling a first motion vector which is used when the first restored frame is decoded, according to the frame distance ratio to generate a second motion vector;
   applying the second motion vector to the current frame to generate a third restored frame; and
   calculating a weighted average value of the first restored frame and the third restored frame to generate the second restored frame.

9. The method of claim 6, wherein the generating of the second restored frame comprises:
   obtaining an absolute difference between each macroblock of the first restored frame and a corresponding macroblock of the first reference frame;
   obtaining a sum of absolute differences (SAD) for all macroblocks of the first restored frame;
   if the SAD is less than a predetermined first reference value, applying motion compensation to the predetermined first reference frame and the first restored frame to generate a third restored frame, and calculating a weighted average value of the first restored frame and the third restored frame to generate the second restored frame;

if the SAD is greater than the predetermined first reference value and less than a predetermined second reference value, selecting the first reference frame as the second restored frame; and if the SAD is greater than the second reference value, selecting the first restored frame as the second restored frame.

10. The method of claim 6, further comprising, if a difference between the current frame and the IDR-I frame in a display order is within a predetermined distance range, determining that the current frame is near the IDR-I frame.

11. The method of claim 6, further comprising, if a difference between the current frame and the IDR-I frame in a display time is within a predetermined time interval, determining that the current frame is near the IDR-I frame.

12. The method of claim 6, further comprising, if the current frame refers to a different frame across the IDR-I frame, determining that the current frame is near the IDR-I frame.

13. The method of claim 6, wherein the buffer is a Decoded Picture Buffer (DPB).

14. A method of encoding a motion picture frame, the method comprising:
   encoding a first frame, which is a P frame that is to be displayed last among a plurality of P frames that are to be displayed before an Instantaneous Decoding Refresh-I (IDR-I) frame is displayed;
   encoding the IDR-I frame;
   encoding a second frame which is a P frame that is to be displayed first among a plurality of P frames that are to be displayed after the IDR-I frame is displayed; and
   maintaining a reference frame stored in a buffer for encoding the first frame until the second frame is encoded.

15. The method of claim 14, further comprising encoding a plurality of B frames that are to be displayed between the first frame and the IDR-I frame in a display order, with reference to the reference frame.

16. The method of claim 15, wherein the maintaining of the reference frame comprises emptying the buffer after encoding a B frame that is to be displayed last among the plurality of B frames.

17. The method of claim 14, wherein the buffer is a Decoded Picture Buffer (DPB).

18. A non-transitory computer-readable medium encoded with computer executable code to perform a method, the method comprising:
   decoding a first frame which is a P frame that is to be displayed last among a plurality of P frames that are to be displayed before an Instantaneous Decoding Refresh-I (IDR-I) frame is displayed;
   decoding the IDR-I frame;
   decoding a second frame which is a P frame that is to be displayed first among a plurality of P frames that are to be displayed after the IDR-I frame is displayed; and
   maintaining a reference frame stored in a buffer for decoding the first frame until the second frame is decoded.

19. A non-transitory computer-readable medium encoded with computer executable code to perform a method, the method comprising:
   encoding a first frame, which is a P frame that is to be displayed last among a plurality of P frames that are to be displayed before an Instantaneous Decoding Refresh-I (IDR-I) frame is displayed;
   encoding the IDR-I frame;
   encoding a second frame which is a P frame that is to be displayed first among a plurality of P frames that are to be displayed after the IDR-I frame is displayed; and
   maintaining a reference frame stored in a buffer for encoding the first frame until the second frame is encoded.

* * * * *